(12) United States Patent
Noordhuis

(10) Patent No.: US 8,256,343 B2
(45) Date of Patent: Sep. 4, 2012

(54) COFFEE MAKER COMPRISING MEANS FOR GENERATING A ROTATION IN A FLOW OF BEVERAGE

(75) Inventor: Joeke Noordhuis, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1114 days.

(21) Appl. No.: 11/911,652

(22) PCT Filed: Apr. 12, 2006

(86) PCT No.: PCT/IB2006/051133
§ 371 (c)(1),
(2), (4) Date: Oct. 15, 2007

(87) PCT Pub. No.: WO2006/111890
PCT Pub. Date: Oct. 26, 2006

(65) Prior Publication Data
US 2009/0266239 A1 Oct. 29, 2009

(30) Foreign Application Priority Data

Apr. 18, 2005 (EP) .................................. 05103067
Apr. 12, 2006 (WO) ................. PCT/IB2006/051133

(51) Int. Cl.
A47J 31/46 (2006.01)
A47J 31/40 (2006.01)

(52) U.S. Cl. ............. 99/300; 99/298; 99/302 R; 99/323; 99/295

(58) Field of Classification Search .................... 99/295, 99/298, 300, 323, 302 R
See application file for complete search history.

(56) References Cited

U.S. PATENT DOCUMENTS 5,414,095 A * 5/1995 Harris ........................... 549/254

FOREIGN PATENT DOCUMENTS

| EP | 727164 | 8/1996 |
| EP | 878158 | 11/1998 |
| WO | WO 03055366 A2 * | 7/2003 |
| WO | WO 2004105564 A1 * | 12/2004 |
| WO | 20050063089 | 7/2005 |
| WO | WO 2005063089 A1 * | 7/2005 |
| WO | 2006066622 | 6/2006 |

* cited by examiner

Primary Examiner — Henry Yuen
Assistant Examiner — Jianying Atkisson

(57) ABSTRACT

A pad holder of a coffee maker for making coffee with a foam layer on top includes a stud plate having studs for supporting a coffee pad containing ground coffee beans and an outlet opening for delivering coffee extract. Studs in the direct vicinity of the outlet opening are arranged in a circle, where surfaces of the studs form a circular directing surface. During operation of the coffee maker, a flow of coffee extract enters a space encompassed by the studs via channels between the studs, and is put into rotation as a result of interaction with the directing surface. Consequently, the coffee flow enters the outlet opening in a rotating condition, causing the outlet opening to deliver the coffee as a spray of fine droplets, from which the foam is created.

19 Claims, 5 Drawing Sheets

COFFEE MAKER COMPRISING MEANS FOR GENERATING A ROTATION IN A FLOW OF BEVERAGE

The present invention relates to a beverage-making device such as a coffee maker, comprising means for generating a rotation in a flow of beverage flowing over an outlet surface towards an outlet opening arranged in the outlet surface.

Such a beverage-making device is known, for example, from WO 03/055366. The known beverage-making device is a coffee maker and serves for making coffee with a foam layer on top. In general, the coffee is obtained by causing water to flow through a quantity of ground coffee beans, which process takes place in a so-called extracting chamber of the coffee maker.

Downstream of the extracting chamber, an inlet passage is arranged, which extends through a stub that projects from a bottom of the extracting chamber. Near a bottom end, the inlet passage divides itself into two twister branches, upstream portions of which extend radially away from a main branch of the inlet channel, and downstream portions of which extend in screw-like fashion about an outer side of the stub. The downstream branch portions issue into a whirl chamber, which is present between an end of the stub and a bottom of a cup in which a bottom end of the stub is accommodated. Furthermore, an outlet passage is provided, which extends from a central portion of a bottom of the whirl chamber. An outlet end of the outlet passage faces a top surface of a bottom of a lower housing in which the bottom of the extracting chamber, the stub, and the cup are suspended. This top surface is also referred to as collision surface.

For the purpose of forming foam on coffee extract formed in the extracting chamber, the coffee maker is provided with a coffee extract path that extends from the extracting chamber. This coffee extract path is formed by the inlet passage for receiving coffee extract, the whirl chamber downstream of the inlet passage for receiving coffee extract from the inlet passage, and the outlet passage extending from the whirl chamber for discharging coffee extract from the whirl chamber. This configuration of the branches of the inlet passage causes the coffee extract in the whirl chamber to rotate during operation. In particular, the rotation is imparted to the coffee extract in the whirl chamber in that the downstream portions of the branches of the inlet channel issue into the whirl chamber in directions having a component tangential to a central axis of the whirl chamber. Consequently, coffee extract is discharged from the whirl chamber in a rotating manner via the outlet passage.

The rotating coffee extract causes a conical spray when discharged through the outlet passage, which spray comprises fine droplets of coffee extract. The droplets hit the collision surface, on which the impact of the droplets causes air to get entrained. When the droplets are subsequently received in a cup or the like, the presence of entrained air leads to a formation of a foam layer on top of the coffee.

There is a demand for an alternative beverage-making device, such as a coffee maker, which is capable of performing the same functions as the known coffee maker, i.e. making a beverage with a foam layer on top, while having a construction that is simpler than the construction of the known coffee maker with the inlet passage and the branches. The present invention provides a solution to the problem of finding a way to meet this demand. In particular, according to the present invention, a beverage-making device such as a coffee maker is provided, which device comprises means for generating a rotation in a flow of beverage flowing over an outlet surface towards an outlet opening arranged in the outlet surface, wherein the rotation-generating means comprise a curved directing surface encompassing a rotation space in which the outlet opening is present, and wherein at least one inlet for providing access to the rotation space is arranged in the rotation-generating means, which inlet interrupts the directing surface.

In the beverage-making device according to the present invention, a rotation in a flow of beverage flowing toward an outlet opening is obtained by means of rotation-generating means having a curved directing surface encompassing a rotation space in which the outlet opening is present, at least one inlet for providing access to the rotation space being arranged in the rotation generating means, which inlet interrupts the directing surface. During operation of the beverage-making device, the flow of beverage is forced to enter the rotation space through the inlet. Initially, the beverage flows along the curved directing surface inside the rotation space, whereby the flow is forced to follow a curvatory path along the surface, as a consequence of which a rotation is obtained in the flow. The flow spirals towards the outlet opening and finally exits the rotation space through this opening. Advantageously, the dimensions of the outlet opening are such that the rotating flow of beverage is released from the opening as a spray comprising fine droplets of beverage.

In the known coffee maker, the rotation-generating means comprise the branches of the inlet passage, which have a rather complex configuration. The rotation-generating means of the beverage-making device according to the present invention, however, comprise a curved directing surface interrupted by at least one inlet. As a construction with a surface is simpler than a construction with branches, the beverage-making device according to the present invention is easier to manufacture than the known coffee maker.

Moreover, according to the present invention, it is possible to have a construction in which the outlet surface constitutes a bottom surface of a more or less cylindrical whirl chamber, the directing surface constitutes a curved standing surface of the whirl chamber, and a bottom surface of a pad containing an extractable material to be used in preparing the beverage constitutes a top surface of the whirl chamber. Consequently, the number of components of the beverage-making device can be significantly reduced with respect to the number of components of the known coffee maker. Preferably, the outlet surface and the directing surface are both part of a holder for holding at least one pad. When a surface capable of functioning as a collision surface is also integrated in the pad holder, there is no need for a construction present underneath the pad holder to comprise more components than a component for conducting the beverage to at least one cup. It is even possible that the beverage is directly released from the collision surface into a cup.

In a preferred embodiment of the beverage-making device according to the present invention, the rotation-generating means comprise a number of projections extending beyond the outlet surface, which projections are arranged in a ring. In such an embodiment, the directing surface is formed by surfaces of the projections. During operation of the beverage-making device, the flow of beverage enters the rotation space encompassed by the projections through spaces between the projections and is made to rotate by the surfaces of the projections.

Advantageously, the projections are circularly arranged at relatively small mutual distances, such that relatively narrow inlet channels are formed by relatively small spaces between the projections, and directions in which the inlet channels extend deviate to a substantial extent from directions in which relevant radii of the circle extend. In this respect, the relevant radii are the radii at the locations where the inlet channels terminate in the rotation space. In this advantageous arrangement, a transition between surfaces of a single projection, wherein one surface borders an inlet channel between the projection and an adjacent projection and another surface is part of the directing surface, may be chosen so as to be relatively smooth. It is achieved thereby that, in a location where a flow of beverage enters the rotation space, a direction of this flow of beverage substantially coincides with a direction in which the directing surface extends in this location, so that the flow of beverage is directed along the directing surface from the moment the flow enters the rotation space, and the rotation in the flow is obtained in a natural manner, practically without collisions or sharp bends.

The beverage-making device may comprise a holder for holding at least one pad that contains extractable material such as ground coffee beans, which holder comprises a stud plate for supporting the pad as well as an outlet opening. Preferably, the holder is movably arranged with respect to other components of the beverage-making device. Advantageously, the rotation-generating means comprise a ring of directing studs encompassing a space in which the outlet opening is present in a beverage making device which is equipped with a holder having a stud plate and an outlet opening. The directing surface is formed by surfaces of the directing studs in such a case, in conformity with the above-described case in which the rotation-generating means comprise projections arranged in a ring around the outlet opening, and inlets providing access to the space in which the outlet opening is present are formed by spaces between the directing studs.

The present invention also relates to a holder for holding at least one pad containing an extractable material such as ground coffee beans and suitable for use in a beverage-making device such as a coffee maker, comprising means for generating a rotation in a flow of beverage flowing over a bottom of the holder towards an outlet opening arranged in the holder. According to the present invention, it is possible to have a holder which is suitable for use in two different orientations in the beverage-making device, rotation-generating means being arranged at one side of the bottom of the holder and also at another side of the bottom of the holder.

The present invention will now be explained in greater detail with reference to the Figures, in which similar parts are indicated by the same reference signs, and in which.

Figure 1:
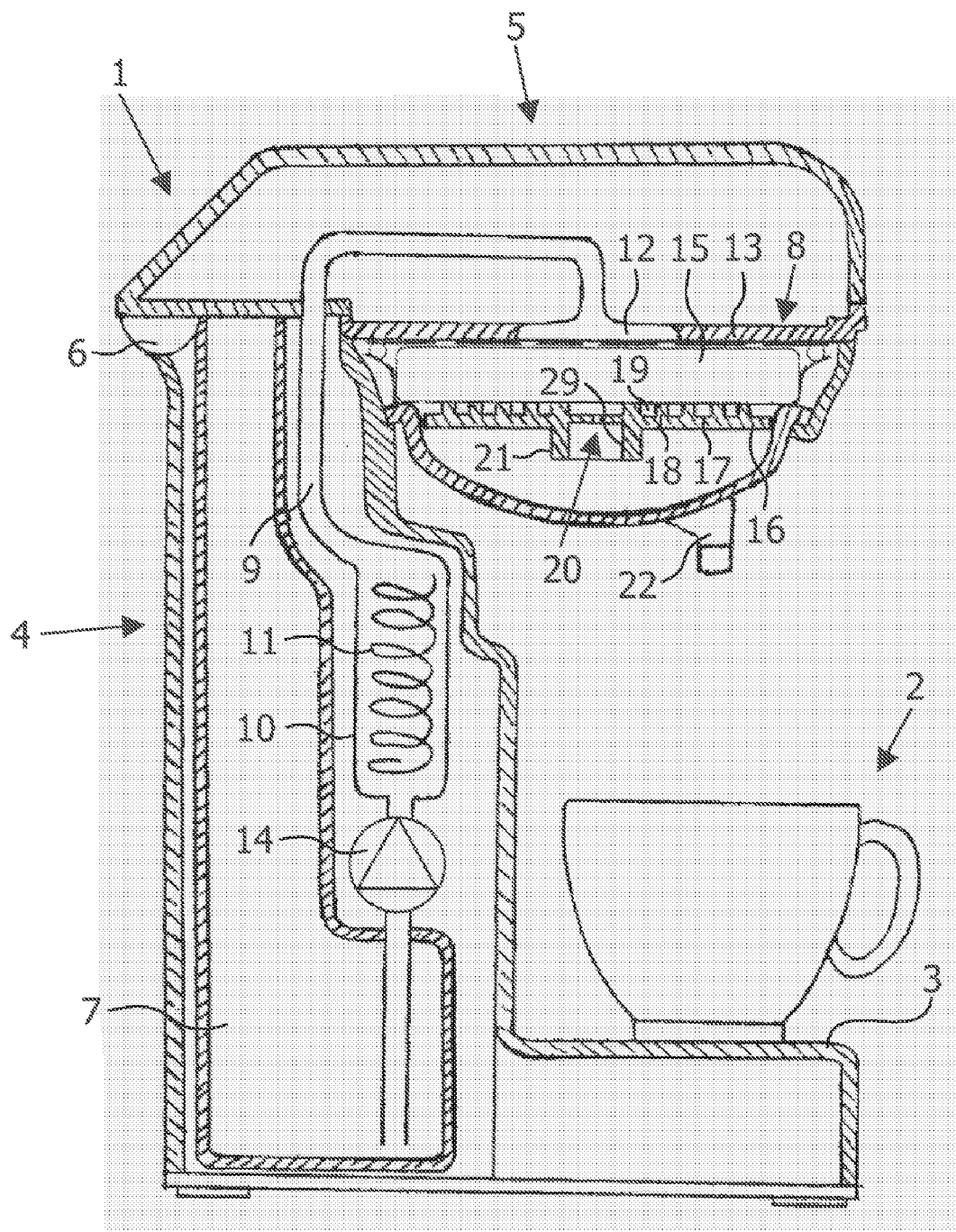
FIG. 1 is a diagrammatic lateral cross-section of a coffee maker according to the present invention, a coffee pad placed therein, and a cup placed on a plateau of the coffee maker.

FIG. 1 shows a coffee maker 1 according to the present invention and a cup 2 placed on a plateau 3 of the coffee maker 1. The coffee maker 1 is suitable for making coffee having a small-bubble foam layer, wherein the cup 2 serves for receiving the coffee.

The coffee maker 1 comprises a housing 4 and a cover 5 hinged to the housing 4 by a hinge 6, which cover 5 is movable between a closed position and an open position. In the closed position, the cover 5 seals off a top side of the housing 4, whereas in the open position a space is present between the cover 5 and the top side of the housing 4. The plateau 3 for supporting one or more cups 2 to be filled with coffee is arranged at a bottom side of the housing 4.

Inside the housing 4, a water tank 7 for containing water is arranged. During operation of the coffee maker 1, water is transported from the water tank 7 to an extracting chamber 8 where the water is forced to flow through a quantity of ground coffee beans for the purpose of making coffee. A water transport path extending from the water tank 7 to the extracting chamber 8 comprises a conduit 9 extending through a heating chamber 10 in which an electric heating element 11 is arranged. At an end of the conduit 9, a sprinkling head 12 is arranged, which is located in a top wall 13 of the extracting chamber 8. A pump 14 is arranged in the water transport path, for causing a displacement of the water from the water tank 7 to the extracting chamber 8.

FIG. 1 shows a coffee pad 15 placed inside the coffee maker 1. The coffee pad 15 comprises an envelope filled with a quantity of ground coffee beans. Water is forced to flow through the coffee pad 15 during operation of the coffee maker 1, in which process the envelope acts as a filter. The interaction between the pressurized water and the coffee pad 15 inside the extraction chamber 8 thus leads to the preparation of coffee.

The coffee pad 15 is supported by a pad holder 16, in particular by a stud plate 17 arranged at an upper side of a bottom of the pad holder 16. The pad holder 16 is removably arranged with respect to other components of the coffee maker 1. The stud plate 17 of the pad holder 16 comprises a number of studs 18, each of the studs 18 being arranged at a distance from adjacent studs 18, so that interspaces 19 are obtained. The studs 18 serve to support the coffee pad 15, while the interspaces 19 serve to allow a flow of coffee to pass from the coffee pad 15 towards an outlet opening 20 arranged in the pad holder 16.

A tube 21 is arranged at a lower side of the bottom of the pad holder 16, a longitudinal axis of this tube 21 extending through the outlet opening 20. During operation of the coffee maker 1, the tube 21 plays a role in generating foam in a way which will be elucidated hereinafter. The coffee maker 1 comprises a dispensing unit 22 for transporting coffee that flows from the tube 21 to the cup 2.

Figure 2:
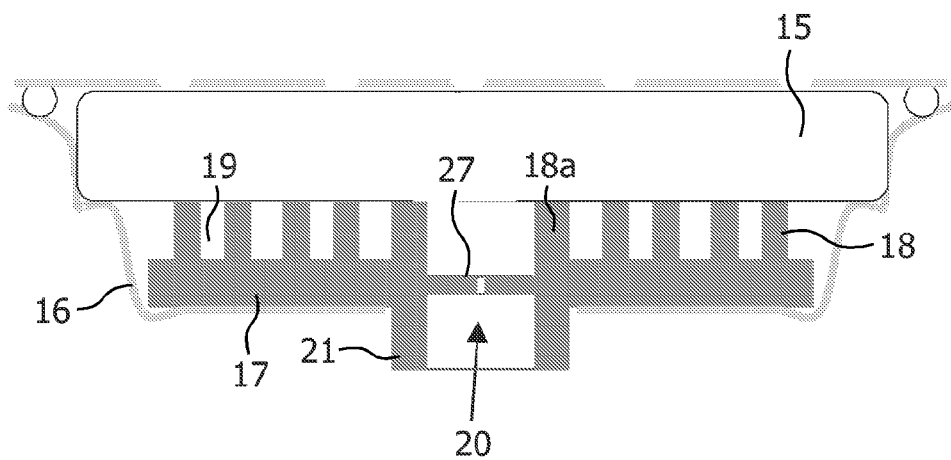
FIG. 2 is a diagrammatic lateral cross-section of a pad holder according to the present invention, a coffee pad being supported by the pad holder.

FIG. 2 is a lateral cross-sectional view of a pad holder 16 according to the present invention. FIG. 2 also shows a coffee pad 15 which is supported by the pad holder 16.

Figure 3:
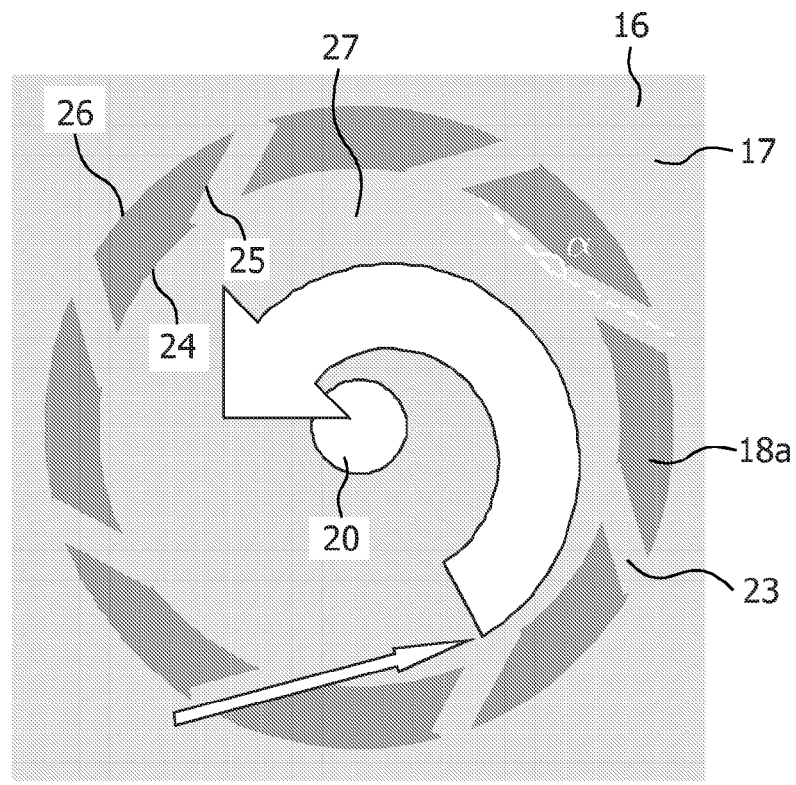
FIG. 3 is a diagrammatic plan view of a central portion of the pad holder as shown in FIG. 2.
Figure 4:
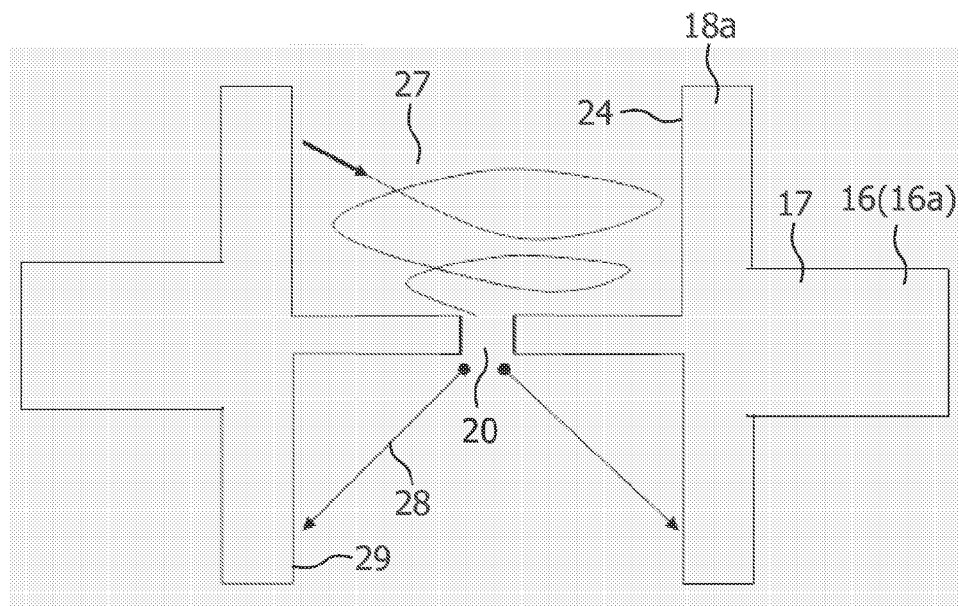
FIG. 4 is a diagrammatic lateral cross-section of the central portion of the pad holder shown in FIG. 2, in which a path followed by the coffee flow is diagrammatically depicted.

FIGS. 3 and 4 present views of a central portion of the pad holder 16. These Figures only show a number of the studs 18 of the pad holder 16, which will hereinafter be referred to as directing studs 18a. The shown directing studs 18a are arranged in a circle around the outlet opening 20 so as to be separated from each other by inlet channels 23. The shown directing studs 18a form an inner ring of the full set of studs 18, as it were. There are no other studs 18 between the directing studs 18a and the outlet opening 20.

At a side facing the outlet opening 20, the directing studs 18a comprise a concave surface 24. In the example shown, the concave surfaces 24 of the directing studs 18a coincide with a circle, interrupted by the inlet channels 23 present between the directing studs 18a. These inlet channels 23 are delimited by plane surfaces 25 of the directing studs 18a. At a side opposite to the side where the concave surface 24 is present, the directing studs 18a comprise a convex surface 26. In the example shown, the convex surfaces 26 of the directing studs 18a coincide with a circle, interrupted by the inlet channels 23 present between the directing studs 18a. Furthermore, the circle described by the concave surfaces 24 of the directing studs 18a and the circle described by the convex surfaces 26 of the directing studs 18a are coaxially arranged in the example shown.

The inlet channels 23 extend in directions which deviate to a substantial extent from directions in which relevant radii of the above-mentioned imaginary circles extend. This achieves that a relatively large angle α, of close to 180°, is present at one side of each inlet channel 23 between the relevant plane surface 25 and the concave surface 24 of a directing stud 18a. Consequently, when a coffee flow coming from an inlet channel 23 enters a space 27 encompassed by the directing studs 18a, the flow initially finds its way along the concave surface 24 of the directing stud 18a where the relatively large angle α is present between the plane surface 25 at the side of the inlet channel 23 and the concave surface 24. As the coffee flow moves along the concave surface 24 of the directing stud 18a, the flow is forced to follow a curved path. Eventually, the coffee flow leaves of the concave surface 24 of the directing stud 18a and spirals towards the outlet opening 20.

In FIG. 3, a path followed by a coffee flow through an inlet channel 23 and inside the space 27 encompassed by the directing studs 18a is indicated by means of two arrows. A straight arrow is used to indicate the path of the coffee flow through the inlet channel 23 and along the concave surface 24 of the directing stud 18a, where the relatively large angle α is present between its plane surface 25 at the side of the inlet channel 23 and its concave surface 24. A bent arrow is used to indicate the spiraling path followed by the coffee flow from the relevant directing stud 18a towards the outlet opening 20.

It is clear from the preceding paragraphs that a rotation in a flow of coffee present in a bottom portion of the extracting chamber 8, underneath the coffee pad 15, and moving towards the outlet opening 20 of the pad holder 16, is obtained in a relatively easy manner in the coffee maker 1 according to the present invention. It is not necessary to use additional components for generating the rotation of the flow. In stead, a number of studs 18 of the stud plate 17 for supporting the coffee pad 15 are used, in particular the studs 18a in the direct vicinity of the outlet opening 20, and the rotation of the coffee flow is realized as a result of the configuration and the shape of these studs 18a, which are also referred to as directing studs 18a. When the flow enters the space 27 encompassed by the directing studs 18a, it initially moves along the concave surface 24 of one or more directing studs 18a, as a consequence of which it becomes curved and starts to rotate, and subsequently spirals towards the outlet opening 20 as its flow speed increases.

In FIG. 4, the coffee flow inside the space 27 encompassed by the directing studs 18a is indicated by means of a curved line, starting with an arrow. It is clearly shown that the rotation obtained in the coffee flow comprises a downwardly oriented spiral that ends at the outlet opening 20.

Since the coffee flow enters the outlet opening 20 while in rotation, a conical spray 28 of fast-moving small coffee droplets is obtained. In FIG. 4, this spray 28 is indicated by means of two straight arrows. Foam is generated from this conical spray 28, i.e. in that the coffee droplets impact on a collision surface 29. In the process, air gets entrained, so that a top layer of very fine bubbles or foam is formed when the coffee is received in the cup 2.

The coffee is forced to flow through the dispensing unit 22 in the coffee maker 1, after which the coffee exits the dispensing unit 22 and drops into the cup 2. In this cup 2 the foam caused by the entrained air will float on the coffee, thus providing a required "crema" effect.

Figure 5:
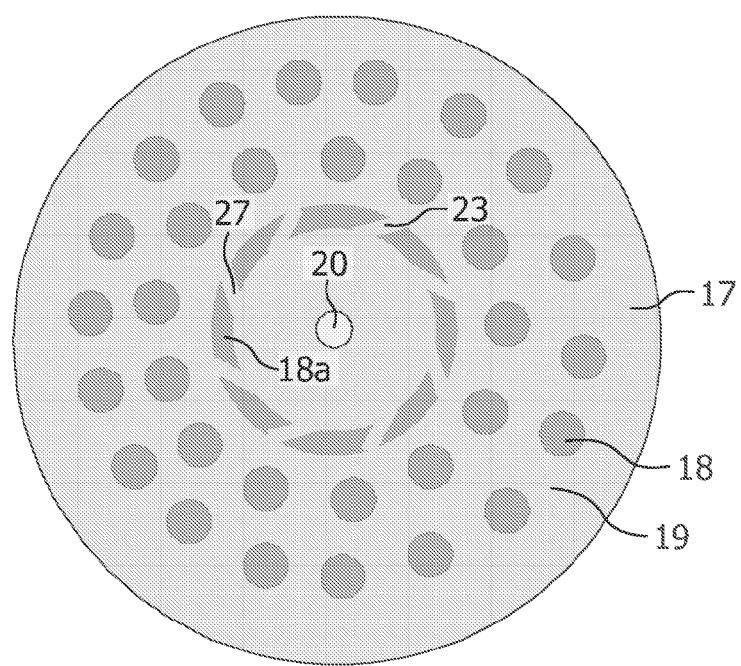
FIG. 5 is a diagrammatic plan view of a stud plate of a pad holder according to the present invention.

Within the scope of the present invention, the stud plate 17 of the pad holder 16 may be shaped in any suitable manner. The number of studs 18, 18a may be chosen freely, wherein it is important that the studs 18, 18a are capable of providing sufficient support to at least one coffee pad 15. FIG. 5 shows a possible embodiment of the stud plate 17.

Also, the collision surface 29 may be realized in any suitable manner within the scope of the present invention. Preferably, the collision surface 29 is part of one or more elements of the pad holder 16, so that it is not necessary for the coffee maker 1 to be equipped with additional means for generating foam.

The tube 21 arranged at the lower side of the bottom of the pad holder 16 constitutes an element of the pad holder 16, an inner surface of the tube 21 serving as the collision surface 29.

An important recognition on which the present invention is based relates to the use of studs 18a for realizing a collision surface 29. In such a case, the collision surface 29 is formed by surfaces of the studs 18a, and air gets entrained as the studs 18a are hit by coffee droplets exiting the outlet opening 20. In a practical embodiment, the pad holder 16 comprises studs 18a arranged in a ring encompassing a space 27 where the outlet opening 20 is present, which studs 18a are provided at the lower side of the bottom of the pad holder 16.

Figure 6:
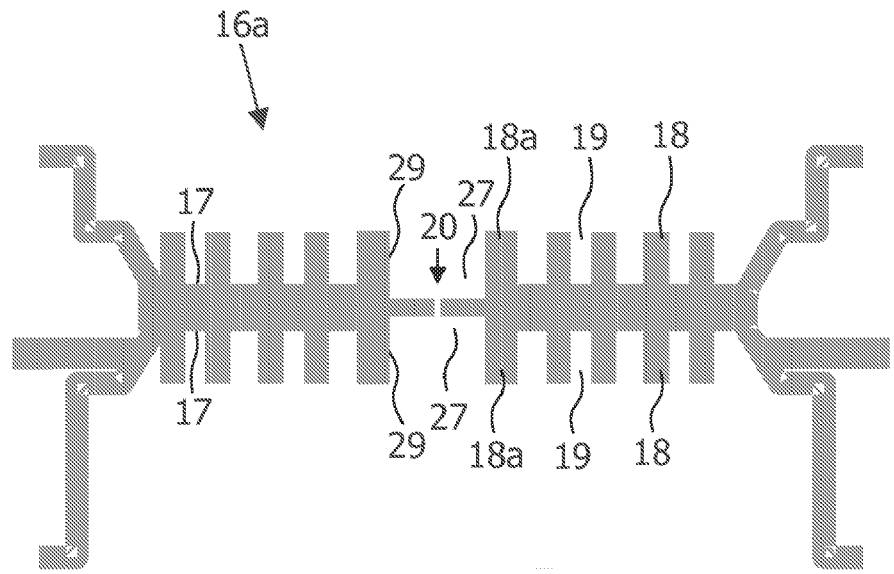
FIG. 6 is a diagrammatic lateral cross-section of a reversible pad holder according to the present invention.
Figure 7:
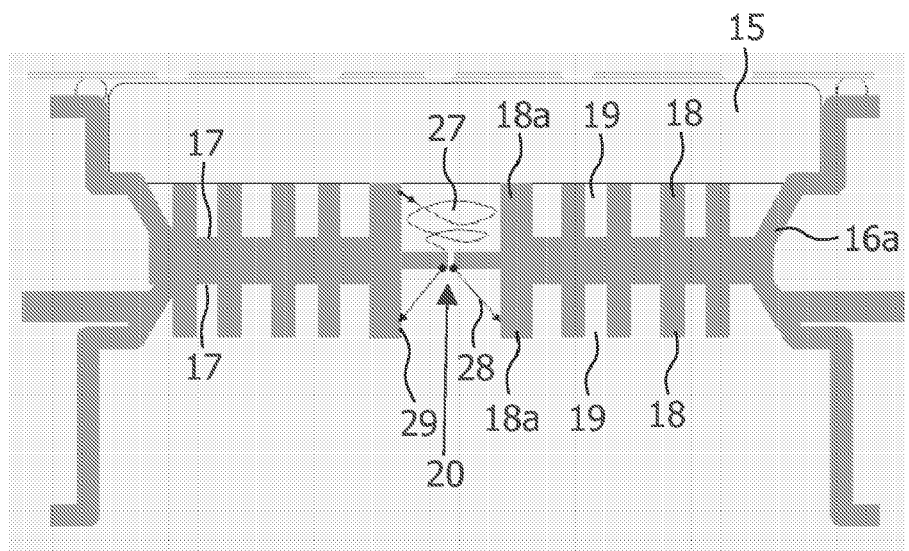
FIG. 7 is a diagrammatic lateral cross-section of the reversible pad holder as shown in FIG. 6 in a first orientation, with a coffee pad supported by the pad holder.
Figure 8:
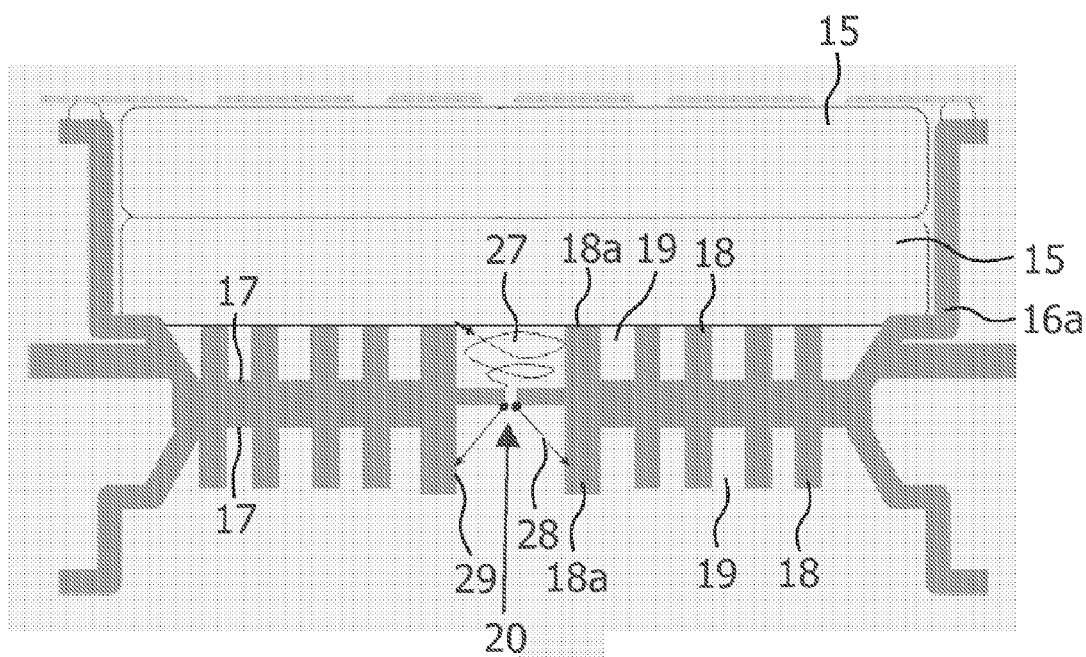
FIG. 8 is a diagrammatic lateral cross-section of the reversible pad holder of FIG. 6 in a second orientation, with two coffee pads supported by the pad holder.

The recognition that it is possible to use studs 18a for realizing a collision surface 29 and the recognition that it is possible to use studs 18a as rotation-generating means together lead to the creation of a pad holder which is suitable for use in two different orientations in the coffee maker 1. An example of such a pad holder, which will be referred to as reversible pad holder 16a hereinafter, is shown in FIGS. 6-8.

The reversible pad holder 16a comprises two stud plates 17, one stud plate 17 being arranged at one side of the bottom of the pad holder 16a and another stud plate 17 being arranged at another side of the pad holder 16a. Furthermore, studs 18a in the direct vicinity of the outlet opening 20 of the reversible pad holder 16a are arranged in a ring on both sides. For example, these studs 18a are positioned and shaped like the studs 18a shown in FIGS. 3 and 5. Hence, the reversible pad holder 16a comprises two sets of studs 18a which are capable of functioning as rotation-generating means on the one hand, and which are capable of constituting a collision surface 29 on the other hand, besides being capable of supporting a coffee pad 15, such that one of these sets is arranged at the upper side of the bottom of the pad holder 16a and another one of these sets is arranged at the lower side of the bottom of the pad holder 16a. In fact, both sets of studs 18a form an interrupted surface, which can be used both as a directing surface in a process of generating a rotation in a flow of coffee and as a collision surface 29 in a process of forming foam.

In both possible orientations of the reversible pad holder 16a, a ring of studs 18a encompassing the outlet opening 20, present at the side of the pad holder 16a constituting the upper side of the pad holder 16a, plays a role in the process of generating a rotation in a coffee flow that moves towards the outlet opening 20 of the pad holder 16a, and another ring of studs 18a encompassing the outlet opening 20, present at the side of the pad holder 16a constituting the lower side of the pad holder 16a, acts as a collision surface 29 for receiving coffee droplets which are emitted by the outlet opening 20 as a result of the fact that the coffee flow enters the outlet opening 20 in a rotating condition. When the orientation of the reversible pad holder 16a is changed, the ring of studs 18a which in the former orientation had been involved in the process of generating a rotation in a coffee flow will now act as a collision surface 29, and the ring of studs 18a which in the former orientation had acted as a collision surface 29 will now take part in the process of generating a rotation in a coffee flow.

It is very advantageous to have a reversible pad holder 16a in various situations, for example in a situation in which the extraction chamber 8 of the coffee maker 1 is capable of receiving one coffee pad 15 as well as a stack of two coffee pads 15. For the purpose of receiving and holding two coffee pads 15 the vertical dimension of the pad holder 16 needs to be greater than for the purpose of receiving and holding one coffee pad 15. In a reversible pad holder 16a, one side of the pad holder 16a may be suitable for receiving and holding one coffee pad 15, whereas the other side of the pad holder 16a may be suitable for receiving and holding two coffee pads 15. The two stud plates 17 of the reversible pad holder 16a may be identical, but this is not necessary.

The reversible pad holder 16a shown in FIGS. 6-8 is adapted to receiving and holding one coffee pad 15 at one side, and to receiving and holding two coffee pads 15 at another side. In FIG. 7, the reversible pad holder 16a is shown in a first orientation, wherein the side which is suitable for receiving and holding one coffee pad 15 is up. FIG. 7 also shows the coffee pad 15. Conversely, FIG. 8 shows the reversible pad holder 16a in a second orientation, wherein the side which is suitable for receiving and holding two coffee pads 15 is up. FIG. 8 also shows the two coffee pads 15.

If the reversible pad holder 16a is used, there is no need for the use of two separate pad holders 16, one pad holder 16 being suitable for receiving and holding one coffee pad 15 and the other pad holder 16 for receiving and holding two coffee pads 15. Hence, the reversible pad holder 16a is more convenient to a user of the coffee maker 1.

In the coffee maker 1 according to the present invention, a space functioning as a whirl chamber, i.e. a space in which rotation is generated in a coffee flow as a result of interaction between the coffee flow and rotation-generating means, is delimited by the bottom of the pad holder 16, 16a, the concave surfaces 24 of the directing studs 18a, and a bottom surface of a coffee pad 15 present in the coffee maker 1. The whirl chamber is thus located directly underneath the coffee pad 15, and there is no need for additional components for building a separate whirl chamber. By contrast, in the coffee maker known from WO 03/055366, the whirl chamber is located at a considerable distance from the coffee pad 15, and the whirl chamber is present between an end of a stub projecting from the bottom of the extracting chamber and a bottom of a cup in which a bottom end of the stub is held.

FIGS. 3 and 5 show rotation-generating means comprising eight directing studs 18a and eight inlet channels 23. This does not alter the fact that it is very well possible within the scope of the invention to have rotation-generating means with other numbers of directing studs 18a and inlet channels 23. In general, it is preferred to have more than one inlet in the rotation-generating means, so that the coffee flow can enter the rotation space at several locations, and the rotation can be imparted in several locations. This is advantageous for achieving an even distribution of coffee in the rotation space and for obtaining an even rotation, especially if the locations where the inlets issue into the rotation space are evenly distributed about the circumference of the rotation space.

The coffee maker 1 may comprise any means for forming a collision surface 29 for receiving coffee droplets. In the examples shown, the collision surfaces 29 are formed by a tube 21 and a ring of studs 18a, respectively. In the case of the tube 21, it is possible to have a conical tube 21 tapering in a downward direction, so that an angle between the direction of motion of the coffee droplets and the collision surface 29 is closer to 90°, and the impact of the droplets on the surface 29 is enhanced. Furthermore, for example, the collision surface may be formed by a wire mesh or the like, which is capable of obtaining a very fine foam, as droplets hitting a wire are split into smaller droplets, besides entraining air.

In embodiments of the pad holder 16, 16a in which a collision surface 29 for receiving coffee droplets from the outlet opening 20 is formed by one or more elements of the pad holder 16, 16a, the entire process of the formation of foam takes place in the pad holder 16, 16a. This is very advantageous, as it is not necessary to use further components for the purpose of obtaining foam on the coffee.

In a typical embodiment of the coffee maker 1 according to the present invention, the preparation of the coffee may take 10 to 60 seconds. A typical volume of obtained coffee is within a range of 50 to 300 milliliters, while the pressure prevailing during the process of making coffee is within a range of 1 to 4 bars. In this coffee maker 1, a suitable value of a diameter of the outlet opening 20 is within a range of 0.5 to 1.2 millimeters. These are practical values for the various particulars of the coffee maker 1 and the associated process of making coffee, but other values may indeed very well be possible.

It will be clear to those skilled in the art that the scope of the present invention is not limited to the examples discussed in the foregoing, but that several amendments and modifications thereof are possible without deviating from the scope of the present invention as defined in the attached claims.

In the foregoing, among other things, a pad holder 16, 16a of a coffee maker 1 for making coffee having a foam layer on top is disclosed. The pad holder 16, 16a comprises at least one stud plate 17 having studs 18, 18a for supporting a coffee pad 15 containing ground coffee beans, and an outlet opening 20 for delivering coffee extract. A number of studs 18a of the stud plate 17, in particular studs 18a in the direct vicinity of the outlet opening 20, are arranged in a ring, such that surfaces 24 of the studs 18a form an annular directing surface. During operation of the coffee maker 1, a flow of coffee extract enters a space 27 encompassed by the studs 18a via channels 23 between the studs 18a and is put into rotation as a result of interaction with the directing surface. Consequently, the coffee flow enters the outlet opening 20 in a rotating condition, causing the outlet opening 20 to deliver the coffee as a spray 28 of fine droplets, from which the foam is created.

The invention claimed is:

1. A beverage-making device using at least one pad containing extractable material comprising:
   an outlet including an outlet opening for dispensing a beverage;
   means for generating a rotation in a flow of the beverage that moves over an outlet surface towards the outlet opening arranged in the outlet surface, wherein the rotation-generating means comprise a curved directing surface encompassing a rotation space in which the outlet opening is present; and
   at least one inlet channel for providing access to the rotation space and being arranged in the rotation-generating means, wherein the at least one inlet channel interrupts the curved directing surface, wherein the rotation-generating means comprise a number of projections extending beyond the outlet surface for supporting the at least one pad, wherein the projections are arranged in a circle and have curved surfaces with spaces between the curved surfaces, wherein the at least one inlet channel is formed by a space between the curved surfaces of the projections, and wherein a direction in which the at least one inlet channel extends deviate from a direction of a radius of the circle.

2. The beverage-making device according to claim 1, further comprising a holder for holding the at least one pad containing extractable material, wherein the holder comprises the outlet surface having the projections supporting the at least one pad, and wherein the outlet opening is arranged in the holder.

3. A holder for holding at least one pad containing extractable material suitable for use in a beverage-making device, the holder comprising:
- an outlet including an outlet opening arranged in the holder;
- rotation-generating means for generating a rotation in a flow of beverage that moves over a bottom of the holder, towards the outlet opening, wherein the rotation-generating means comprise a curved directing surface encompassing a rotation space in which the outlet opening is present; and
- at least one inlet channel for providing access to the rotation space and being arranged in the rotation-generating means, wherein the at least one inlet channel interrupts the curved directing surface,
- wherein the rotation-generating means comprise a number of projections extending beyond the outlet surface for supporting the at least one pad, wherein the projections are arranged in a circle and have curved surfaces with spaces between the curved surfaces, wherein the at least one inlet channel is formed by a space between the curved surfaces of the projections, and wherein a direction in which the at least one inlet channel extends deviate from a direction of a radius of the circle.

4. The holder according to claim 3, wherein the projections include a number of directing studs arranged in a direct vicinity of the outlet opening, and wherein the directing studs are arranged in a ring.

5. The holder according to claim 4, wherein surfaces of the directing studs at an inner side of the ring are concave.

6. The holder according to claim 4, wherein the concave surfaces of the directing studs coincide with the circle, interrupted by the spaces between the directing studs.

7. The holder according to claim 3, further comprising a collision surface for receiving droplets of the beverage issuing from the rotation space through the outlet opening, wherein the collision surface forms part of at least one element of the holder.

8. The holder according to claim 7, wherein the collision surface is positioned at a side of the bottom of the holder other than a further side thereof at which the rotation-generating means are positioned.

9. The holder according to claim 7, further comprising studs positioned at a side of the bottom of the holder other than a further side thereof at which the rotation-generating means are positioned, wherein the studs are arranged in a ring, and wherein the collision surface comprises surfaces of the studs.

10. The holder according to claim 7, further comprising a tube positioned at a side of the bottom of the holder other than a further side thereof at which the rotation generating means are positioned, wherein the collision surface comprises an inner surface of the tube.

11. The holder according to claim 3, suitable for use in two different orientations in the beverage-making device, wherein rotation-generating means are arranged at a first side of the bottom of the holder and at a second side of the bottom of the holder.

12. The holder according to claim 11, further comprising two stud plates having studs for supporting the pad, wherein a first stud plate is arranged at the first side of the bottom of the holder, and wherein a second stud plate is arranged at the second side of the bottom of the holder.

13. A holder for holding a pad containing extractable material suitable for use in a beverage-making device, the holder comprising:
- a plate having an outlet opening; and
- studs projecting from the plate and arranged around the outlet opening,
- wherein a set of the studs are configured to support the pad, includes curved directing surfaces and are arranged in a circle around the outlet opening, wherein at least one inlet channel interrupts the curved directing surfaces, and wherein a direction in which the at least one inlet channel extends deviates from a direction in which a radius of the circle extends.

14. The holder of claim 13, wherein at least one stud of the set of the studs extends away from the plate in two directions, for providing a collision surface for a beverage issuing from the outlet opening.

15. The holder of claim 14, wherein the at least one stud extends in a first direction to provide the collision surface, and extends in a second direction to support the pad.

16. The holder of claim 15, wherein the first direction is opposite the second direction.

17. The beverage-making device of claim 1, wherein the curved surfaces of a projection of the projections includes two opposite parallel surfaces delineating two circles around the outlet opening, and two side surfaces connecting the two opposite parallel surfaces, wherein the two side surfaces are not parallel to each other.

18. The holder of claim 3, wherein the curved directing surfaces of a projection of the projections includes two opposite parallel surfaces delineating two circles around the outlet opening, and two side surfaces connecting the two opposite parallel surfaces, wherein the two side surfaces are not parallel to each other.

19. The holder of claim 13, wherein the curved directing surfaces of a stud of the set of the studs includes two opposite parallel surfaces delineating two circles around the outlet opening, and two side surfaces connecting the two opposite parallel surfaces, wherein the two side surfaces are not parallel to each other.

* * * * *